J. H. DOYLE AND W. J. KENNY.
BAIL FOR CONTAINER BODIES.
APPLICATION FILED AUG. 18, 1917.
1,351,896.
Patented Sept. 7, 1920.
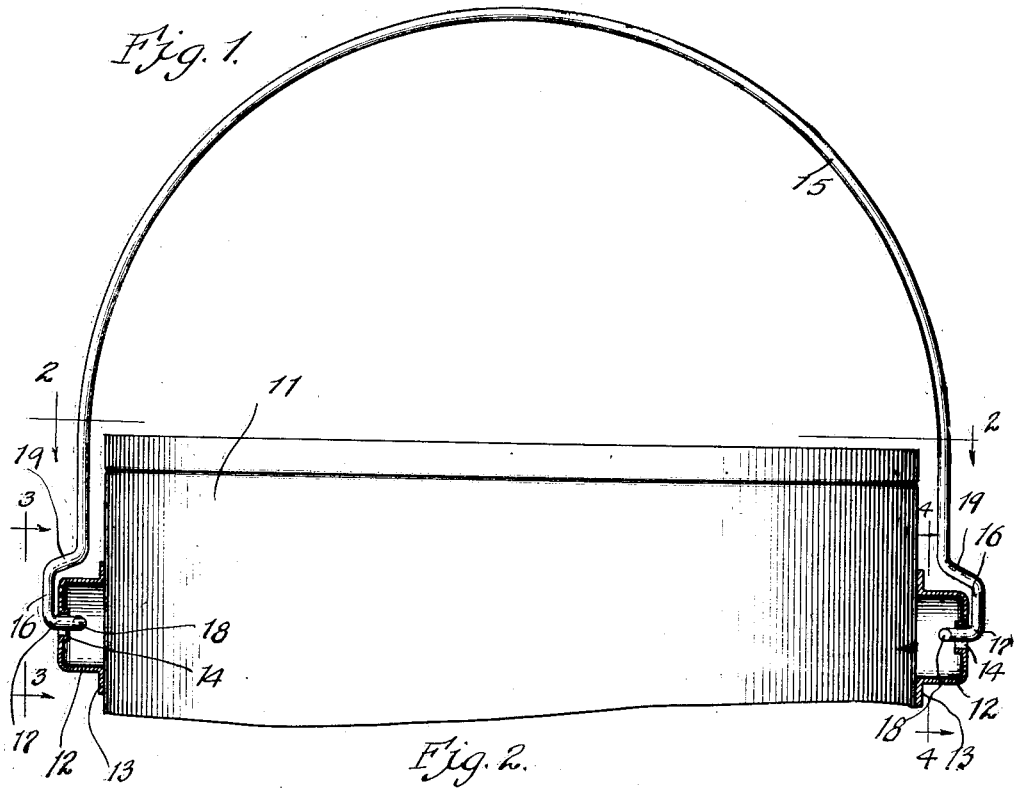
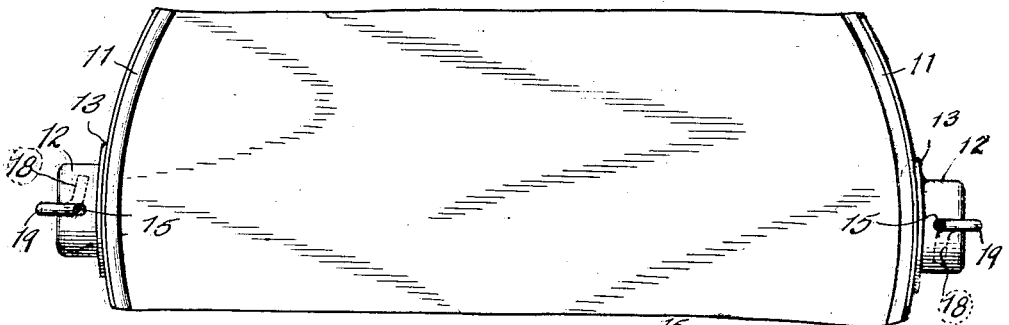
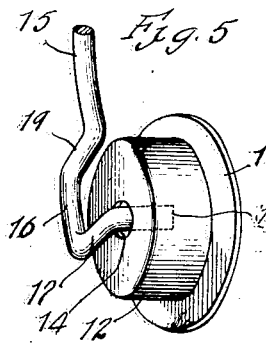

UNITED STATES PATENT OFFICE.

JAMES H. DOYLE, OF CHICAGO, AND WILLIAM J. KENNY, OF CICERO, ILLINOIS, ASSIGNORS TO AMERICAN CAN COMPANY, OF NEW YORK, N. Y., A CORPORATION OF NEW JERSEY.

BAIL FOR CONTAINER-BODIES.

1,351,896.  Specification of Letters Patent.  Patented Sept. 7, 1920.

Application filed August 18, 1917. Serial No. 186,873.

*To all whom it may concern:*

Be it known that we, JAMES H. DOYLE and WILLIAM J. KENNY, citizens of the United States, residing in Chicago and Cicero, respectively, in the county of Cook and State of Illinois, have invented a new and useful Improvement in Bails for Container-Bodies, of which the following is a specification.

This invention relates in general to bails for container bodies and has for its object the improvement of the construction of the bail so that it may not become disarranged in use.

A principal object of the invention is the provision of a bail so constructed and arranged with respect to the body to which it is attached as to make accidental removal of it substantially impossible.

The invention has particular application to bails made of wire and adapted for attachment to container bodies of strong flexible material, such as sheet metal and the like. Such bails and such bodies while well adapted to support contents of considerable weight frequently become somewhat bent and it is an aim of this invention to prevent any ordinary distortion of the body or the bail or both from resulting in any detachment of an end of the bail from the body.

A further object of the invention is the provision of a bail adapted to sustain considerable weight without danger of becoming unfastened.

Another object of the invention is the provision of a bail which may be cheaply manufactured and readily assembled with the body.

Other objects and advantages of the invention will be apparent as it is better understood from the following description when considered in connection with the accompanying drawing illustrating a preferred embodiment thereof.

On the drawing,

Figure 1 is a side elevation of a container or bucket provided with a bail embodying our present invention, parts of the ears being shown in section to disclose the bail end construction;

Fig. 2 is a partial section taken on the line 2—2 of Fig. 1;

Fig. 3 is a side elevation of the bail ear and an end of the bail in the present instance located at the left of Fig. 1;

Fig. 4 is a section taken on the line 4—4 of Fig. 1; and

Figs. 5 and 6 are perspective views showing an end of the bail in the process of its attachment to the body.

For the purpose of illustrating our invention we have shown on the drawing a container or bucket body 11, which may have any usual or preferred construction but which in the present instance is constructed of thin strong sheet metal.

Upon the side of the body are secured two bail ears 12 of cylindrical shape having flanges 13 soldered in place and having openings 14 through which the ends of the bail, which is indicated at 15, are pivotally held. The bail in the present instance consists of a relatively heavy piece of wire having a body of the usual curvature and provided with offsets or loops 16 near the ends. The lower sides 17 of the loop 16 are disposed through the openings 14 in the bail ears and the ends 18 of the bail extend out from the plane of the body of the bail and the plane of the loop as perhaps is best indicated in Fig. 2 preferably extending in opposite directions. The upper sides 19 of the loops bring the body of the bail close to the outer surface of the container wall and it will be observed that any ordinary distortion of the bail or body will not result in a loosening of the connection between the bail ends and the ears, or in their disconnection.

When the bail is first formed one end, for example the end at the right of the figure, is given the bend shown on the drawing. That is to say, the loop 16 is formed up in the plane of the body 15 and the end 18 bent at substantially right angles thereto. The other end, however, is initially formed as shown in Fig. 5. That is to say, the end 18 is disposed substantially in the plane of the body 15 with the loop 16 extending out at right angles to this plane.

The bail is assembled by first positioning the end at the right of the drawing by moving the end 18 through the aperture 14 and turning the bail over, the part 17 being thus disposed through said aperture; thereafter the other end is positioned by disposing the end 18 through the opening in the other bail ear and then bodily bending the loop 16 at this side, *i. e.*, the left on the drawing, through approximately 90° or until it also stands substantially in the plane of the body of the bail, parts being so arranged that the two ends 18 then extend in opposite direction. In other words the loop 16 is bent from the position shown in Fig. 5 to that shown in Fig. 6.

It will be manifest that substantially the only way in which this bail can be detached is to reverse this assembling operation or by bending one of the loops from its position in the plane of the bail sufficiently to permit the end of the bail to be moved out of the ear.

Excessive weight on the bail has relatively little tendency to strain it except possibly at the parts 17 and 19 which, however, does not result in the freeing of the bail by reason of the laterally extending ends 18 in the ears.

It is thought that the invention and many of its attendant advantages will be understood from the foregoing description, and it will be apparent that various changes may be made in the form, construction and arrangement of the parts without departing from the spirit and scope of the invention or sacrificing any of its material advantages, the form hereinbefore described being merely a preferred embodiment thereof.

The method of attaching bails disclosed herein is not claimed in this application, the same being the subject of the application of William J. Kenny, filed December 22, 1919, Serial No. 346,717.

We claim:

A bail for buckets and the like, having its ends formed for pivotal connection with the bail ears, one of said ends of the bail being bent to form an extremity which extends inward in a direction toward the other end of the bail and is adapted to be inserted in said direction into its bail ear after the other end of the bail has been connected with the other bail ear, the leg of the bail near said extremity being bent to form an offset which extends in a lateral direction and which is adapted to be twisted into line with the main portion of the bail, thereby turning said extremity into a lateral position to permanently secure it within the bail ear into which it has been inserted.

Signed in the presence of two subscribing witnesses.

JAMES H. DOYLE.
WILLIAM J. KENNY.

Witnesses:
J. C. CARPENTER,
T. J. O'BRIEN.